UNITED STATES PATENT OFFICE.

CHARLES A. LEWIS, OF CHICAGO, ILLINOIS, ASSIGNOR TO ADAMS & ELTING COMPANY, OF CHICAGO, ILLINOIS, A CORPORATION OF ILLINOIS.

ANTIFREEZING COMPOUND.

1,282,249.      Specification of Letters Patent.      Patented Oct. 22, 1918.

No Drawing.      Application filed November 23, 1917. Serial No. 203,525.

*To all whom it may concern:*

Be it known that I, CHARLES A. LEWIS, a citizen of the United States, residing at Chicago, in the county of Cook and State of Illinois, have invented certain new and useful Improvements in Antifreezing Compounds, of which the following is a specification.

This invention relates to anti-freezing componds, and more particularly to those compounds or mixtures adapted to be introduced into the radiator system of internal combustion engines for the purpose of preventing freezing thereof in cold weather and consequent rupture of the circulating system. It is of course to be understood that while the freezing compound hereinafter described is particularly adapted for this purpose, it is not to be understood as being limited to this particular application, for the compound is equally applicable to other uses as is well known to those skilled in the art.

One of the objects of the present invention is to provide an anti-freezing compound particularly adapted for the above use which will be inexpensive to manufacture. A further object is to provide a compound of the above character which will not clog the pipes through which it is circulated when the solution becomes super-saturated on evaporation of the water. A further object is to provide a compound having a minimum corrosive action upon the linings of the circulating system. Other objects will be in part obvious and in part hereinafter pointed out.

In making the compound I prefer to use as a base calcium chlorid dissolved in water, to which glucose, borax and caramel solutions are added. I have found that the desired proportions are approximately as follows:

| | | |
|---|---|---|
| Calcium chlorid | 39.83% | by weight |
| Water | 59.38 | " " |
| Borax | 1.13 | " " |
| Glucose | 1.66 | " " |
| Caramel solution | Trace | |
| | 100.00% | |

The glucose and caramel solutions are added for the purpose of preventing crystallization of the calcium chlorid when the compound becomes super-saturated on evaporation of the water. It has been found that when calcium chlorid solution has been heated for a period, some of the water evaporates and in time such super-saturated solution will be formed. When this solution cools the calcium chlorid is precipitated out in the form of hard crystalline masses which adhere to the walls of the circulating system, and particularly in the water line, thereby more or less clogging the pipes and retarding the flow of the solution therethrough. By the use of glucose in the solution these crystals do not form in such hard masses and are more readily dissolved by the addition of water. The borax eliminates to a certain extent the corrosive action that might otherwise take place by using calcium chlorid alone, as the hygroscopic character of the salt tends to set up a slight corrosive action.

It will be seen from the above that the compound is very inexpensive to manufacture and in the proportions above stated will stand a temperature as low as 50° F. below zero without freezing. In climates where such low temperatures are never reached water may be added as desired to raise this freezing temperature. For example, where the temperature never reaches 10° above zero one gallon of the compound above set forth may be mixed with approximately a gallon and a half of water.

It will thus be seen that the present invention provides a simple and practical non-freezing compound adapted to accomplish, among others, all of the objects and advantages herein set forth.

I claim as my invention—

1. A non-freezing compound comprising a chlorid calcium salt mixed with glucose in the presence of water.

2. A non-freezing compound comprising calcium chlorid dissolved in water to which a relatively small quantity of glucose is added.

3. A non-freezing compound comprising approximately 40 parts of calcium chlorid; 58 parts of water and 2 parts of glucose and borax.

4. A non-freezing compound comprising about one part of chlorid calcium salt dissolved in about one and one half parts of water to which about 2% of glucose is added.

5. A non-freezing compound consisting of approximately 58 parts of water by weight, approximately 40 parts of calcium chlorid by weight and approximately 2% of glucose, borax, and caramel solution.

In testimony whereof I affix my signature in presence of two witnesses.

CHARLES A. LEWIS.

Witnesses:
LESTER J. MICHAEL,
ADAM J. JUSTEN.